(12) United States Patent
Yoon

(10) Patent No.: US 8,645,982 B2
(45) Date of Patent: Feb. 4, 2014

(54) DISC CLAMPING UNIT AND SPINDLE MOTOR HAVING THE SAME

(71) Applicant: LG Innotek Co., Ltd., Seoul (KR)

(72) Inventor: Ho Eop Yoon, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/658,149

(22) Filed: Oct. 23, 2012

(65) Prior Publication Data

US 2013/0104156 A1 Apr. 25, 2013

(30) Foreign Application Priority Data

Oct. 24, 2011 (KR) .................. 10-2011-0108726

(51) Int. Cl.
*G11B 17/028* (2006.01)

(52) U.S. Cl.
USPC .......................................... 720/712; 720/697

(58) Field of Classification Search
USPC .................. 720/600, 601, 658, 695–717
See application file for complete search history.

(56) References Cited

U.S. PATENT DOCUMENTS

| 4,855,990 A * | 8/1989 | Akiyama ..................... 720/703 |
| 6,252,843 B1 * | 6/2001 | Begley et al. ................. 720/708 |
| 2002/0009036 A1 * | 1/2002 | Omori ......................... 369/75.2 |
| 2003/0147337 A1 * | 8/2003 | Kim ............................ 369/270 |
| 2007/0028255 A1 * | 2/2007 | Ito et al. ...................... 720/706 |

* cited by examiner

*Primary Examiner* — Nathan Danielsen
(74) *Attorney, Agent, or Firm* — Saliwanchik, Lloyd & Eisenschenk

(57) ABSTRACT

A spindle motor is disclosed, the spindle motor including a case including a lateral wall unit formed with a hollow hole, and a support unit extended to an inner side of a distal end of the lateral wall unit, a clamper arranged inside the lateral wall unit and supported by the support unit for clamping an upper surface of the optical disc, a cover plate covering the clamper, and an elastic member interposed between the clamper and the cover plate to apply a pressure to the clamper to a direction facing the upper surface of the optical disc.

17 Claims, 3 Drawing Sheets

US 8,645,982 B2

DISC CLAMPING UNIT AND SPINDLE MOTOR HAVING THE SAME

CROSS-REFERENCE TO RELATED APPLICATION

This application claims the benefit under 35 U.S.C. §119 of Korean Patent Application No. 10-2011-0108726, filed Oct. 24, 2011, which is hereby incorporated by reference in its entirety.

BACKGROUND

The present disclosure relates to a disc clamping unit configured to inhibit a disk and a yoke from floating without an assistance of a magnet, and a spindle motor having the disk clamping unit.

In general, an ODD (Optical Disc Driver) functions to record a data on an optical disc or to read a data from an optical disc. The ODD includes a spindle motor rotating an optical disc at a high speed, an optical pickup module moving to a radial direction of the optical disc to record a data on the optical disc or to read a data from the optical disc, a spindle motor transferring the optical pickup module to a radial direction of the disc and a disc clamping unit fixing the optical disc by pressing an upper surface of the optical disc.

A disc clamping unit of an ODD inhibits the optical disc from being separated by pressing an upper surface of the optical disc rotated by the spindle motor. The disc clamping unit includes a metal plate, and a magnet is mounted on a center cone which is an aligning unit coupled to an opening of the optical disc in the spindle motor. The metal plate of the disc clamping unit is absorbed by the center cone of the metal plate, whereby the optical disc is secured between the metal plate and the center cone.

However, the absorbing method of the metal plate at the disc clamping unit using the magnet suffers from a disadvantage in that a manufacturing cost greatly increases due to presence of the magnet, and also greatly increases the number of assembly parts and the number of assembly processes.

BRIEF SUMMARY

The present disclosure is to provide a disc clamping unit suitable for fixing an optical disc to a spindle motor without an assistance of a magnet and a spindle motor using the disk clamping unit.

According to one aspect of the present disclosure, the object described above may be achieved by a disc clamping unit which comprises: a case including a lateral wall unit formed with a hollow hole, and a support unit extended to an inner side of a distal end of the lateral wall unit; a clamper arranged inside the lateral wall unit and supported by the support unit for clamping an upper surface of the optical disc; a cover plate covering the clamper; and an elastic member interposed between the clamper and the cover plate to apply a pressure to the clamper to a direction facing the upper surface of the optical disc.

According to another aspect of the present disclosure, there is provided a spindle motor, the spindle motor comprising: a bearing assembly including a bearing and a bearing housing accommodating the bearing; a stator including a core coupled to the bearing housing and a coil wound on the core; a rotation shaft rotatably inserted into the bearing; a rotor including a yoke coupled to the rotation shaft and a magnet arranged opposite to the core; a turn table coupled to the rotation shaft to contact the yoke; a center cone inserted into the rotation shaft and formed with a non-magnetic material to reciprocate along the rotation shaft; and a disc clamping unit including a non-magnetic material clamper arranged on an upper surface of the turn table to contact the center cone and an elastic member applying an elasticity force to the non-magnetic material clamper to apply a pressure to the non-magnetic material clamper to a direction facing an upper surface of the turn table.

DETAILED DESCRIPTION

Figure 1:
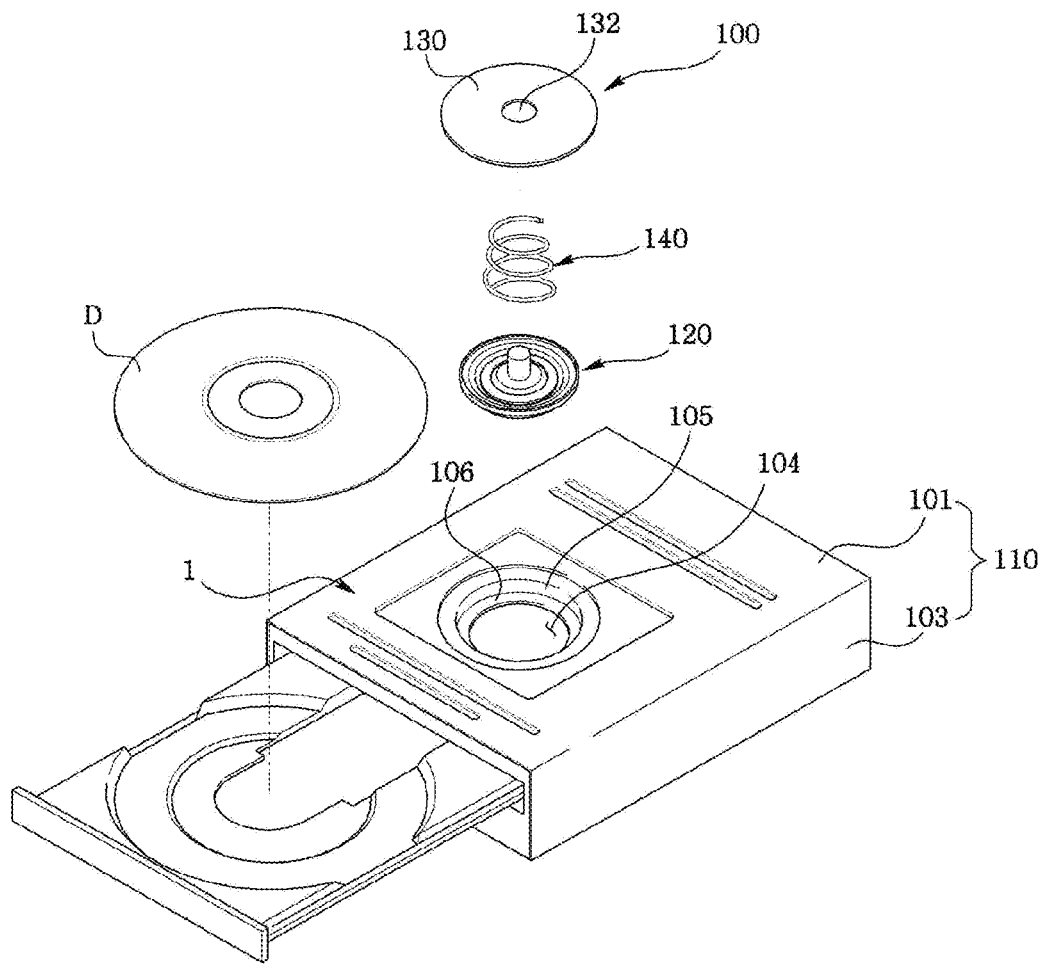
FIG. 1 is an exploded perspective view illustrating an optical disc driving unit including a disc clamping unit according to an exemplary embodiment of the present disclosure.
Figure 2:
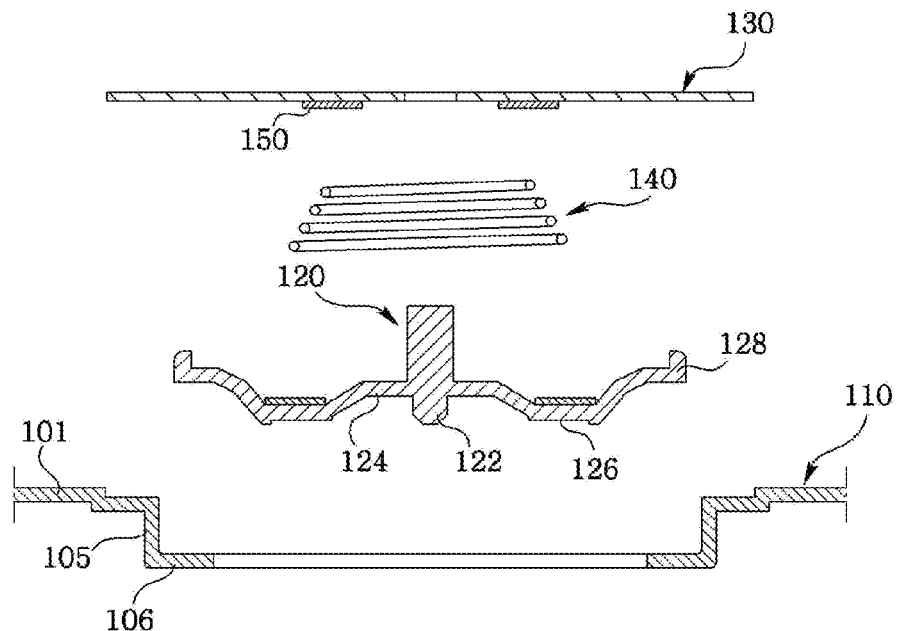
FIG. 2 is an exploded perspective view of a disc clamping unit of FIG. 1.
Figure 3:
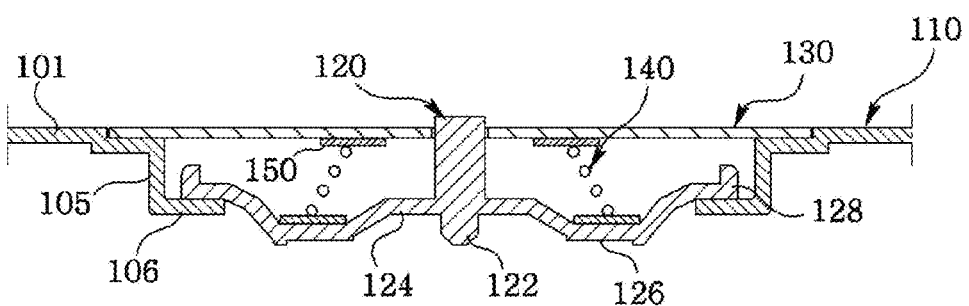
FIG. 3 is a cross-sectional assembly view of an elastic member of FIG. 2.
Figure 4:
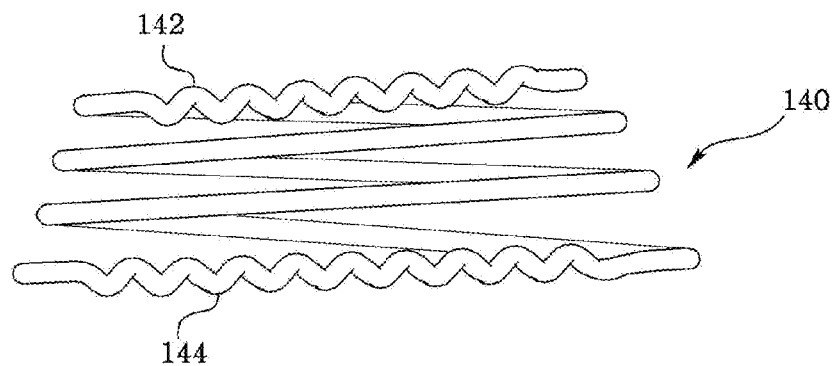
FIG. 4 is a lateral view illustrating an elastic unit of FIG. 2.

FIG. 1 is an exploded perspective view illustrating an optical disc driving unit including a disc clamping unit according to an exemplary embodiment of the present disclosure, FIG. 2 is an exploded perspective view of a disc clamping unit of FIG. 1, FIG. 3 is a cross-sectional assembly view of an elastic member of FIG. 2, and FIG. 4 is a lateral view illustrating an elastic unit of FIG. 2.

Referring to FIGS. 1, 2 and 3, a disc clamping unit (100) includes a case (110) forming an external side of an optical disc driving device (1), a clamper (120) fixing an optical disc (D) by pressing the optical disc (D), a cover plate (130) and an elastic member (140).

The case (110) forms an exterior look of the optical disc driving device (1) and may be formed by press-working a metal plate. The case (110) includes an upper plate (101), and a lateral plate (103) connected to the upper plate (101). The upper plate (101) is formed with a lateral wall unit (105) extended to a bottom surface of the upper plate (101) in a pipe shape and formed with a hollow hole (104), and a support unit (106) extended inwards from a distal end of the lateral wall unit (105) to a direction parallel with the upper plate (101).

A space formed by the lateral wall unit (105) is accommodated with a clamper (120, described later), the support unit (106) is supported by the clamper (120), and the support unit (106) inhibits the clamper (120) from being separated. The clamper (120) vertically moves in the space formed by the lateral wall unit (105).

The clamper (120) is accommodated in the space formed by the lateral wall unit (105), and is supported by the support unit (106). The clamper (120) includes a pillar-shaped boss unit (122), an accommodation unit (124) protruded from a periphery of the boss (122) to accommodate a center cone (described later) in a concave form, a clamping unit (126) extended from the accommodation unit (124) to press an upper surface of an optical disc, and a hitching unit (128) extended from the clamping unit (126) and hitched by the support unit (106). The boss unit (122), the accommodation unit (124), the clamping unit (126) and the hitching unit (128) that forms the clamper (120) in the exemplary embodiment of the present disclosure may be formed with a non-magnetic material that does not act to a magnetic field formed by each part. That is, the clamper (120) in the exemplary embodiment of the present disclosure may be formed with a non-magnetic material such as a synthetic resin.

The cover plate (130) covers the clamper (120) accommodated in the lateral wall unit (105), and the clamper (120) is inhibited from being separated from the space formed inside the lateral wall unit (105) by the cover plate (130). The cover plate (130) is formed in the shape of a plate, and the cover plate (130) is formed with a through hole (132) suitable for the boss unit (122) of the clamper (120) to protrude. The through hole (132) of the cover plate (130) serves to allow the clamper (120) to vertically move inside the lateral wall unit (105) instead of tilting.

The cover plate (130) in the exemplary embodiment of the present disclosure may be formed with a non-magnetic material such as a synthetic resin, for example. Particularly, the cover plate (130) may be manufactured with a Teflon (registered trademark of Dupont, USA) resin robust to friction and wear.

The elastic member (140) may be interposed between the cover plate (130) and the clamper (120). The elastic member (140) in the exemplary embodiment of the present disclosure may include a coil spring, for example. The elastic member (140) may include a metal coil spring or a synthetic resin coil spring, for example. Alternatively, the elastic member (140) may include a leaf spring pressing the clamper (120).

The coil spring which is an elastic member (140) pushes the clamper (120) towards the support unit (106). A first distal end of the elastic member (140) in the exemplary embodiment of the present disclosure may contact an inner lateral surface of the cover plate (130), and a second distal end opposite to the first distal end of the elastic member (140) may contact an inner lateral surface of the clamping unit (126) of the clamper (120).

A first distal end contacting an inner lateral surface of the cover plate (130) in the elastic member (140) may be formed with a first diameter, and a second distal end contacting the clamper (120) in the elastic member (140) may be formed with a second diameter greater than the first diameter. The elastic member (140) can elastically and stably support the clamper (120) by way of formation of diameters of the elastic member (140) in different sizes in the exemplary embodiment of the present disclosure. The clamper is clamped with the optical disc by the elastic member (140), and the clamper (120) may rotate with the optical disc. In a case the clamper (120) rotates with the optical disc, a rotational force is also applied with the elastic member (140) pressing the clamper (120). In a case the rotational force is applied to the elastic member (140), the elastic member (140) may rotate between the clamper (120) and the cover plate (130), where noise and wear of the cover plate (130) or the clamper (120) may be generated when the elastic member (140) rotates.

In order to inhibit or restrict generation of noise or wear of the cover plate (130) or the clamper (120) by the rotation of the elastic member in the exemplary embodiment of the present disclosure, the cover plate (130) of the clamper (130) contacting the elastic member (140) may be formed with a slip layer (150). The slip layer (150) may include a material having a frictional coefficient lower than that of the cover plate (130) or the clamper (120). The slip layer (150) may be formed with a film of a very thin thickness.

Meanwhile, the first distal end of the elastic member (140) contacting the cover plate (130) to inhibit or restrict the noise or wear generated by the cover plate (130) caused by rotation of the elastic member (140) may be formed with at least one first uneven unit (142), as illustrated in FIG. 4.

The one first uneven unit (142) formed on the first distal end of the elastic member (140) is such that the first distal end of the elastic member (140) is made to point-contact the cover plate (130) whereby friction of the cover plate (130) and the first distal end of the elastic member (140) can be greatly reduced. Furthermore, a second distal end of the elastic member (140) contacting the clamper (120) in order to inhibit or restrict the noise or wear generated by the clamper (120) caused by rotation of the elastic member (140) may be formed with at least one second uneven unit (144), as illustrated in FIG. 4.

The second uneven unit (144) formed at the second distal end of the elastic member (140) allows the second distal end of the elastic member (140) to point-contact the clamper (120) whereby friction of the clamper (120) and the second distal end of the elastic member (140) can be greatly reduced.

Figure 5:
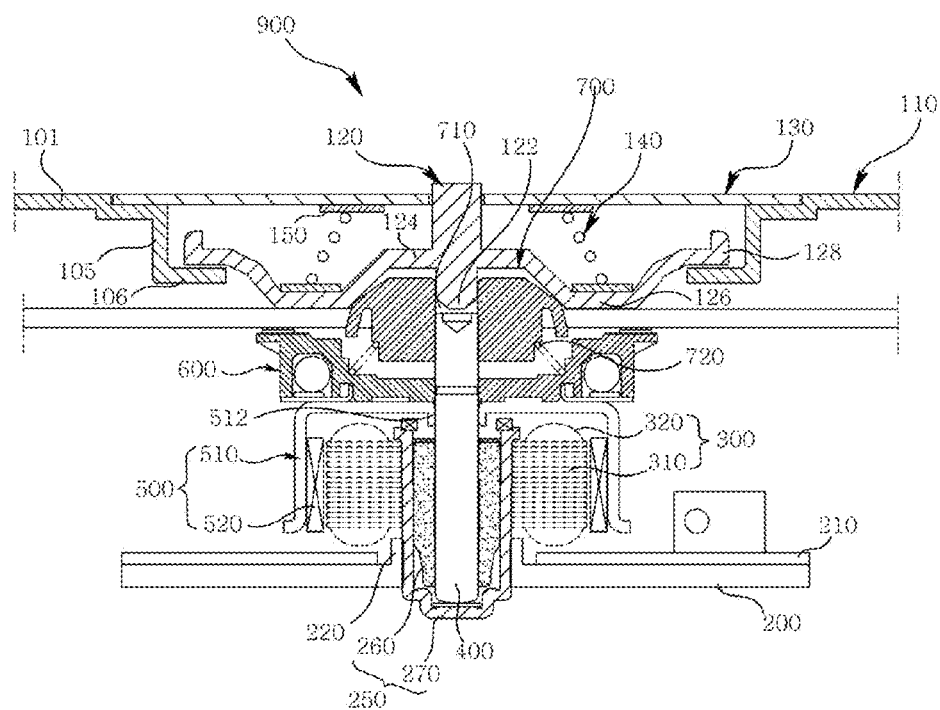
FIG. 5 is a cross-sectional view illustrating a spindle motor including a disc clamping unit.

FIG. 5 is a cross-sectional view illustrating a spindle motor including a disc clamping unit according to another exemplary embodiment of the present disclosure.

Referring to FIG. 5, a spindle motor (900) includes a base plate (200), a bearing assembly (250), a stator (300), a rotation shaft (400), a rotor (500), a turn table (600), a center cone (700) and a disc clamping unit (100).

The base plate (200) is formed in the shape of a plate mounted with a circuit substrate (210), and is formed with a burring unit (220) protruded from a rear surface of the base plate (200) toward a direction facing a front surface opposite to the rear surface of the base plate (200). The bearing assembly (250) includes a bearing (260) and a bearing housing (270). The bearing housing (270) is formed in an upper surface-opened cylinder shape, for example, and is press-fitted by the burring unit (220) of the base plate (200).

The bearing (260) is formed in the shape of a pipe inserted by the rotation shaft (described later), and arranged inside the bearing housing (270). The stator (300) includes a core (310) and a coil (320). The coil (320) is wound on a lug of the core (310), and the core (310) is press-fitted into an external surface of the bearing housing (270). The rotation shaft (400) is rotatably coupled to the bearing (260) of the bearing assembly (250). The rotor (500) includes a yoke (510) and a magnet (520).

The yoke (510) is formed with a bottom-opened cylindrical shape, and a rotational center of an upper plate of the yoke (510) is formed with a yoke burring unit (512) coupled to a periphery of the rotation shaft (400). The magnet (520) is arranged at an inner surface of a lateral plate extended from an upper plate of the yoke (510). The turn table (600) is formed with a shape of a disc, and arranged on the upper plate of the yoke (510) by penetrating the rotation shaft (400). The turn table (600) is press-fitted into the rotation shaft (400), where the rotation shaft (400) and the turn table (600) rotate together.

The center cone (700) includes a through hole (710) inserted into the rotation shaft (400), and is arranged on an upper surface of the turn table (600). The center cone (700) is coupled to the rotation shaft (400) for vertical movement along a periphery of the rotation shaft (400). A coil spring (720) is interposed between the center cone (700) and the turn table (600), where the center cone (700) is elastically supported by the coil spring (720). The center cone (700) is coupled to a through hole formed at a rotational center of the optical disc. The center cone (700) fixes the optical disc and aligns a rotational center of the optical disc to a rotational center of the rotation shaft (400).

The center cone (700) in the exemplary embodiment of the present disclosure is coupled to the disc clamping unit (100) to dispense with a magnet for fixing the optical disc, and the center cone (700) in the exemplary embodiment of the present disclosure includes a non-magnetic material such as a synthetic resin. The center cone (700) in the exemplary embodiment of the present disclosure is coupled to the disc clamping unit (100) without the magnet (described later), whereby the number of manufacturing processes, the number of assembly parts and the manufacturing cost of the spindle motor can be greatly reduced.

Now, referring to FIGS. 1 to 5, the disc clamping unit (100) includes a case forming an external side of an optical disc driving device (1), a clamper (120), a cover plate (130) and an elastic member (140).

The case (110) forms an external look of the optical disc driving device (1), and may be formed by a press-working a metal plate. The case (110) includes an upper plate (101) and a lateral plate (103) connected to the upper plate (101).

The upper plate (101) is formed with a lateral wall unit (105) extended to a bottom surface of the upper plate (101) in a pipe shape and formed with a hollow hole (104), and a support unit (106) extended inwards from a distal end of the lateral wall unit (105) to a direction parallel with the upper plate (101).

A space formed by the lateral wall unit (105) is accommodated with a clamper (120), the support unit (106) is supported by the clamper (120), and the support unit (106) inhibits the clamper (120) from being separated. The lateral wall unit (105) is formed with a space adequate for the clamper (120) to vertically move.

The clamper (120) is accommodated in the space formed by the lateral wall unit (105), and is supported by the support unit (106).

When classified in terms of function, the clamper (120) includes a pillar-shaped boss unit (122) and inserted at a bottom end into a through hole of the center cone (700), an accommodation unit (124) protruded from a periphery of the boss (122) to accommodate a center cone (described later) in a concave form, a clamping unit (126) extended from the accommodation unit (124) to press an upper surface of an optical disc coupled to the center cone (700), and a hitching unit (128) extended from the clamping unit (126) and hitched by the support unit (106). The boss unit (122), the accommodation unit (124), the clamping unit (126) and the hitching unit (128) that forms the clamper (120) in the exemplary embodiment of the present disclosure may be formed with a non-magnetic material that does not act to a magnetic field formed by each part. That is, the clamper (120) in the exemplary embodiment of the present disclosure may be formed with a non-magnetic material such as a synthetic resin.

The cover plate (130) covers the clamper (120) accommodated in the lateral wall unit (105), and the clamper (120) is inhibited from being separated from the space formed inside the lateral wall unit (105) by the cover plate (130). The cover plate (130) is formed in the shape of a plate, and the cover plate (130) is formed with a through hole (132) suitable for the boss unit (122) of the clamper (120) to protrude. The through hole (132) of the cover plate (130) serves to allow the clamper (120) to vertically move inside the lateral wall unit (105) instead of tilting.

The cover plate (130) in the exemplary embodiment of the present disclosure may be formed with a non-magnetic material such as a synthetic resin, for example. Particularly, the cover plate (130) may be manufactured with a Teflon (registered trademark of Dupont, USA) resin robust to friction and wear.

The elastic member (140) may be interposed between the cover plate (130) and the clamper (120). The elastic member (140) in the exemplary embodiment of the present disclosure may include a coil spring, for example. The elastic member (140) may include a metal coil spring or a synthetic resin coil spring, for example.

The coil spring which is an elastic member (140) pushes the clamper (120) towards the center cone (700). A first distal end of the elastic member (140) in the exemplary embodiment of the present disclosure may contact an inner lateral surface of the cover plate (130), and a second distal end opposite to the first distal end of the elastic member (140) may contact an inner lateral surface of the clamping unit (126) of the clamper (120).

A first distal end contacting an inner lateral surface of the cover plate (130) in the elastic member (140) may be formed with a first diameter, and a second distal end contacting the clamper (120) in the elastic member (140) may be formed with a second diameter greater than the first diameter. The elastic member (140) can elastically and stably support the clamper (120) by way of formation of diameters of the elastic member (140) in different sizes in the exemplary embodiment of the present disclosure. The clamper is clamped with the optical disc by the elastic member (140), and the clamper (120) may rotate with the optical disc. In a case the clamper (120) rotates with the optical disc, a rotational force is also applied with the elastic member (140) pressing the clamper (120). In a case the rotational force is applied to the elastic member (140), the elastic member (140) may rotate between the clamper (120) and the cover plate (130), where noise and wear of the cover plate (130) or the clamper (120) may be generated when the elastic member (140) rotates.

In order to inhibit or restrict generation of noise or wear of the cover plate (130) or the clamper (120) by the rotation of the elastic member in the exemplary embodiment of the present disclosure, the cover plate (130) of the clamper (130) contacting the elastic member (140) may be formed with a slip layer (150). The slip layer (150) may include a material having a frictional coefficient lower than that of the cover plate (130) or the clamper (120). The slip layer (150) may be formed with a film of a very thin thickness.

Meanwhile, the first distal end of the elastic member (140) contacting the cover plate (130) to inhibit or restrict the noise or wear generated by the cover plate (130) caused by rotation of the elastic member (140) may be formed with at least one first uneven unit (142), as illustrated in FIG. 4.

The one first uneven unit (142) formed on the first distal end of the elastic member (140) is such that the first distal end of the elastic member (140) is made to point-contact the cover plate (130) whereby friction of the cover plate (130) and the first distal end of the elastic member (140) can be greatly reduced. Furthermore, a second distal end of the elastic member (140) contacting the clamper (120) in order to inhibit or restrict the noise or wear generated by the clamper (120) caused by rotation of the elastic member (140) may be formed with at least one second uneven unit (144), as illustrated in FIG. 4.

The second uneven unit (144) formed at the second distal end of the elastic member (140) allows the second distal end of the elastic member (140) to point-contact the clamper (120) whereby friction of the clamper (120) and the second distal end of the elastic member (140) can be greatly reduced.

As apparent from foregoing, the disc clamping unit according to the present disclosure is advantageously configured such that a center cone coupled to a through hole of an optical disc supported on a turn table is formed with a non-magnetic material, and a clamper pressing the optical disc using elasticity force of an elastic member is arranged on an upper surface of the center cone, whereby the optical disc can be elastically secured without a magnetic force to greatly reduce the number of assembly parts, the number of assembly processes and the manufacturing cost.

Any reference in this specification to "one embodiment", "an embodiment", "exemplary embodiment", etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with others of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A disc clamping unit, the disc clamping unit comprising:
a case including a lateral wall unit formed with a hollow hole, and a support unit extended to an inner side of a distal end of the lateral wall unit;
a clamper arranged inside the lateral wall unit and supported by the support unit for clamping an upper surface of the optical disc;
a cover plate covering the clamper; and
an elastic member interposed between the clamper and the cover plate to apply a pressure to the clamper to a direction facing the upper surface of the optical disc,
wherein the elastic member includes a coil spring, and
wherein an area contacting the cover plate in the elastic member includes a plurality of first uneven units, and an area contacting the clamper in the elastic unit includes a plurality of second uneven units.

2. The disc clamping unit of claim 1, wherein the clamper includes a boss protruded from a center of an upper surface of the clamper, and the cover plate is formed with a through hole inserted by the boss.

3. The disc clamping unit of claim 1, wherein a first distal end contacting the cover plate in the elastic member is formed with a first diameter, and a second distal end contacting the clamper in opposition to the first distal end is formed with a second diameter greater than the first diameter.

4. The disc clamping unit of claim 1, wherein a slip layer generating a rotational slip is formed between the cover plate and the elastic member and between the clamper and the elastic member.

5. The disc clamping unit of claim 1, wherein the clamper includes a flat clamp unit contacting the elastic member and the optical disc, and a lug unit formed inside the elastic member and convexly protruded to an upper surface.

6. The disc clamping unit of claim 1, wherein the clamper is a non-magnetic material.

7. The disc clamping unit of claim 6, wherein the clamper is formed with synthetic resin.

8. The disc clamping unit of claim 1, wherein the elastic member includes any one of a metal coil spring and a synthetic resin coil spring.

9. The disc clamping unit of claim 1, wherein the elastic member includes a leaf spring pressing the clamper to a direction facing the optical disc.

10. A spindle motor, the spindle motor comprising:
a bearing assembly including a bearing and a bearing housing accommodating the bearing;
a stator including a core coupled to the bearing housing and a coil wound on the core;
a rotation shaft rotatably inserted into the bearing;
a rotor including a yoke coupled to the rotation shaft and a magnet arranged opposite to the core;
a turn table coupled to the rotation shaft to contact the yoke;
a center cone inserted into the rotation shaft and formed with a non-magnetic material to reciprocate along the rotation shaft; and
a disc clamping unit including a non-magnetic material clamper arranged on an upper surface of the turn table to contact the center cone and an elastic member applying an elasticity force to the non-magnetic material clamper to apply a pressure to the non-magnetic material clamper to a direction facing an upper surface of the turn table,
wherein an area contacting the cover plate in the elastic member includes a plurality of first uneven units, and an area contacting the clamper in the elastic unit includes a plurality of second uneven units.

11. The spindle motor of claim 10, wherein the clamper is accommodated into a case, and the case includes a lateral wall unit formed with a hollow hole and a support unit formed inwardly along an edge of the lateral wall unit.

12. The spindle motor of claim 10, further comprising slip layers, each formed between the cover plate and the elastic member and between the clamper and the elastic member.

13. The spindle motor of claim 10, wherein the elastic member includes a coil spring.

14. The spindle motor of claim 10, wherein the clamper is formed with a synthetic resin.

15. The spindle motor of claim 10, wherein the elastic member includes any one of a metal coil spring and a synthetic resin coil spring.

16. The spindle motor of claim 10, wherein the elastic member includes a leaf spring pressing the clamper to a direction facing the optical disc.

17. The spindle motor of claim 10, wherein the clamper includes a boss protruded from a center of an upper surface of the clamper, and the cover plate is formed with a through hole inserted by the boss.

* * * * *